Figure 1:
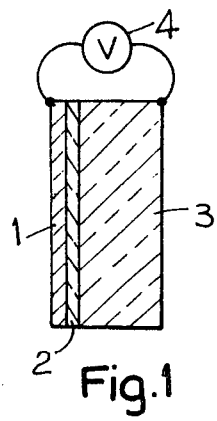

United States Patent
de Cremoux et al.

[15] 3,656,836
[45] Apr. 18, 1972

[54] LIGHT MODULATOR

[72] Inventors: Baudoin de Cremoux; Pierre Leclerc, both of Paris, France

[73] Assignee: Thomson-CSF

[22] Filed: June 26, 1969

[21] Appl. No.: 836,783

[30] Foreign Application Priority Data
July 5, 1968 France..................................158042

[52] U.S. Cl..........................350/160, 331/94.5, 332/7.51
[51] Int. Cl...........................................G02f 1/36, H01s 3/00
[58] Field of Search ..............331/94.5; 350/160; 250/211 J; 332/7.51

[56] References Cited

UNITED STATES PATENTS

| | | | |
|---|---|---|---|
| 2,776,367 | 1/1957 | Lehovec | 350/160 |
| 3,158,746 | 11/1964 | Lehovec | 350/160 |
| 3,462,712 | 8/1969 | Boddy et al. | 350/160 |
| 3,523,190 | 8/1970 | Goetzberger et al. | 250/211 J |

OTHER PUBLICATIONS

" Laser Experiments Involving In–Cavity Modulation with Electro–Optic Crystals." Rugari et al.; Proceedings of the IEEE, July 1964, p. 852

Primary Examiner—Ronald L. Wibert
Assistant Examiner—V. P. McGraw
Attorney—Cushman, Darby & Cushman

[57] ABSTRACT

The application of a voltage between the semiconductor and the conducting layers of a structure wherein said layers are separated by an insulator layer allow the modulation of a luminous radiation propagating through or reflected on said structure.

10 Claims, 7 Drawing Figures

LIGHT MODULATOR

The present invention relates to light modulation by semiconductors.

It is known that semiconductors are capable of absorbing electromagnetic radiations, this effect being particularly marked in the infrared range. The coefficient of absorption varies as a function of the free carrier concentration.

It is also known that the application of a potential difference between the metal layer and the semiconductor of a metal-oxide-semiconductor (MOS) or metal-insulator-semiconductor (MIS) structure, makes it possible to vary the concentration of free charge carriers in the semiconductor in the neighbourhood of the insulating layer. It will be recalled, that an MOS structure (metal-oxide-semiconductor) or a MIS structure (metal-insulator-semiconductor) comprises two layers, one of which is a metal and the other an insulator or an oxide layer deposited upon a semiconductor base.

It is an object of this invention to provide a light modulator device based on these two properties.

According to the invention there is provided a device for modulating a luminous radiation having a predetermined wavelength comprising: a substrate of doped semiconductor material partially transparent to said radiation, having at least two valence bands, and said radiation being capable of allowing the transition of electrons from a lower valence band to an upper valence band; an insulating layer extending over said substrate; a conductive layer extending over said insulating layer, and means for applying between said conductive layer and said substrate a modulating voltage.

For a better understanding of the invention and to show how the same may be carried into effect reference will be made to the drawing accompanying the ensuing description and in which:

FIG. 1 schematically illustrates an MOS structure, and

FIGS. 2 to 7 schematically illustrate various embodiments of the invention.

In FIG. 1, an MOS structure can be seen, comprising a metal layer 1 of a thickness of 50 A, deposited upon an oxide film 2 of a thickness of 1,000 A., the whole being applied to a semiconductor base 3 of a thickness of 100 $\mu$ for example. A voltage source 4 produces a potential difference between the layer 1 and the semiconductor 3.

The semiconductor 3 must exhibit several valence bands. It is well known that semiconductors of this kind have substantial absorption coefficients, which vary as a function of the concentration of free charge carriers. This effect is observed at infrared wavelengths, in particular in the following semiconductors:

Ge (wavelengths : 3.4 $\mu$ − 4.7 $\mu$ − 15 $\mu$ )

Te (wavelengths : 10 $\mu$ )

AlSo, AsGa, $GaP_xAs_{1-x}$, InSb, InAs.

The application of a potential difference between the metal and the semiconductor makes it possible to vary the concentration of free charge carriers in the semiconductor in the neighbourhood of the oxide layer.

In a P-type structure, an increase in the absolute value of the potential difference between the gate and the substrate (this potential difference being negative) will have the effect of increasing the hole concentration in the vicinity of the oxide layer. This will result in a lower population of electrons in the upper valence band in this zone. The arrival of photons will then cause electrons to pass from the lower valence band to the upper valence band. Luminous energy will thus be absorbed by the semiconductor. In the case of an N-type semiconductor, an inversion layer is produced in the vicinity of the oxide layer and the same phenomenon will occur. If the applied voltage V increases, the radiation intensity transmitted will decrease.

The following figures schematically illustrate light modulators according to the invention. In these figures, similar references designate similar elements.

Figure 2:
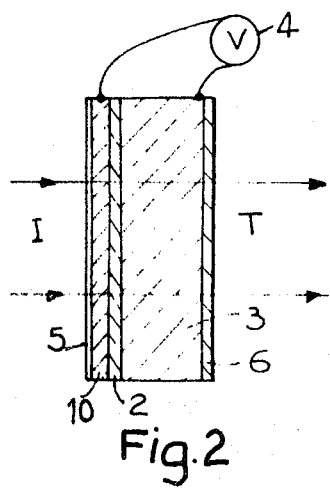

In FIG. 2, a modulator modulating the light propagating therethrough has been shown. It comprises an MOS device such as that shown in FIG. 1, modified in the manner hereinafter described.

It comprises on its two end faces, respective antireflection coatings i.e. low reflectance films 5 and 6. A beam of light is directed on the device and hits the layer 5. It successively propagates through the layers 10, 2, 3 and 6 and leaves then the modulator. The layer 1 is replaced by a layer 10 of such a nature that it should not absorb the radiation being modulated, while being conductive. For example, for a radiation of wavelength $\lambda = 10 \mu$, N-type germanium can be used. A voltage source 4 is connected between the layer 3 and the substrate 3 and produces a variable voltage V.

The modulation is produced by varying the voltage V, which acts as the modulating signal. The coefficient of absorption of the device varies as a function of the voltage V.

Figure 3:
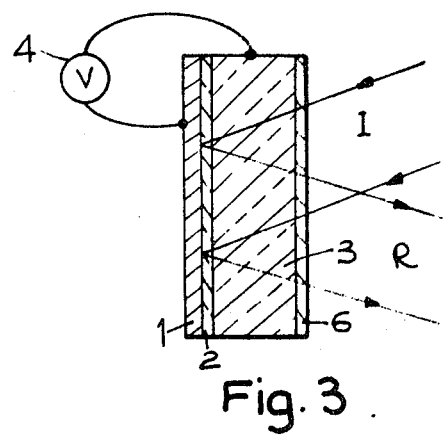

In FIG. 3, the same modulating effect is obtained by reflection.

In this device, which is identical to that of FIG. 1 except that a low antireflection coating 6 is deposited on the substrate 3. The metal layer 1 reflects the incident luminous beam I. The modulation is applied to the luminous beam I and to the reflected ray R, during their passage through the MOS device.

Figure 4:
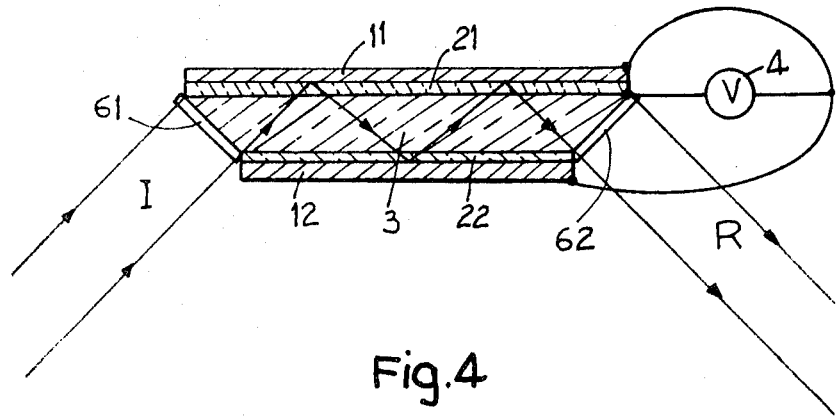

FIG. 4 illustrates a modulator designed so that the beam being modulated experiences a series of multiple reflections. The semiconductor layer 3 is covered on both faces by respective oxide layers 21 and 22, which are in turn covered by respective metal electrodes 11 and 12. The two layers act as two parallel mirrors. Antireflection coatings 61 and 62 cover respectively the end faces of the semiconductor.

The source 4 biases the layers 11 and 12 identically with respect to the semiconductor 3.

Figure 5:
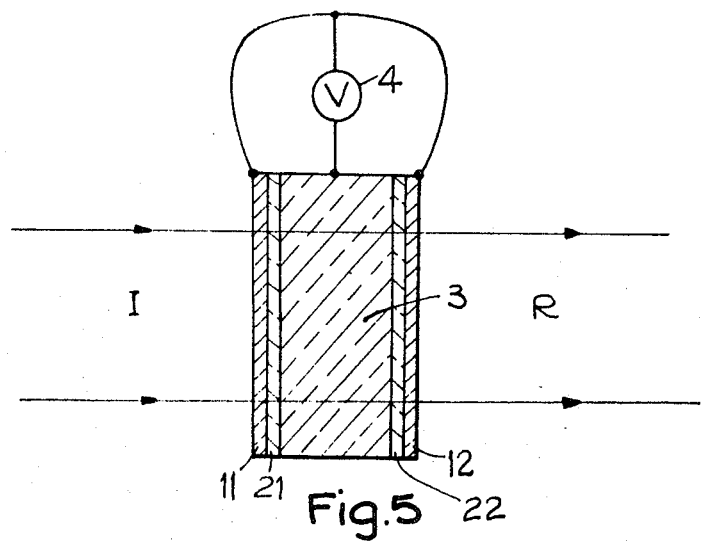

FIG. 5 illustrates a double modulator operating in a manner of a Perot-Fabry cavity. This modulator comprises two MOS devices with a common semiconductor base 3, the two layers 11 and 12 forming the two mirrors of the cavity.

The ray I, normal to the two layers 11 and 12, leaves, after multiple partial reflections on the metal, walls 11 and 12; the electrical circuit is the same as FIG. 4.

Figure 6:
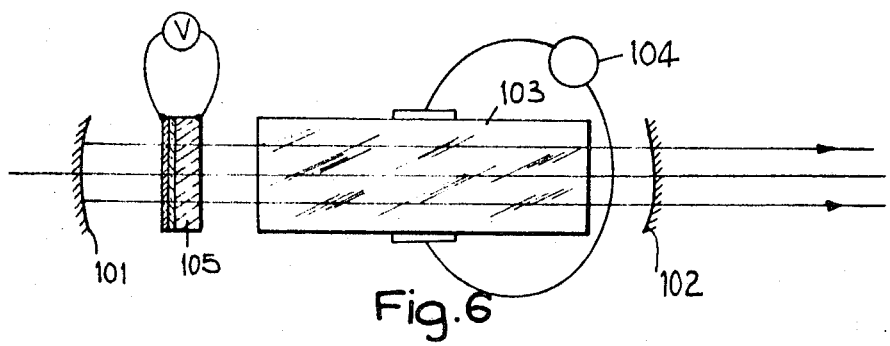
Figure 7:
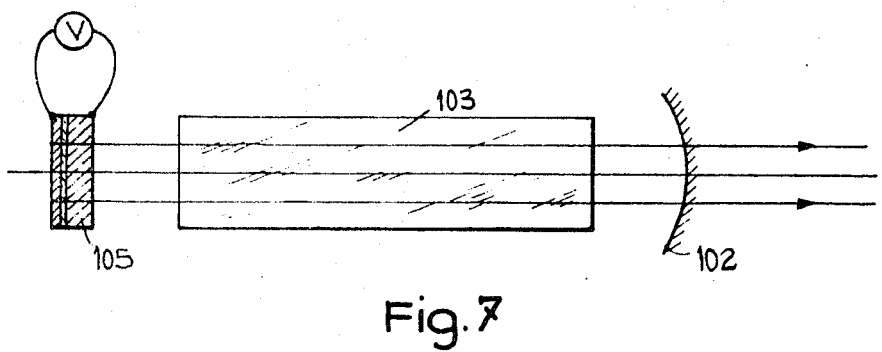

FIGS. 6 and 7 illustrate two embodiments of a laser modulator.

FIG. 6 illustrates a Perot-Fabry cavity comprising two mirrors 101 and 102, the latter being only partially reflective. This cavity contains an MOS device 105 operating by transmission and of the same kind as that shown in FIG. 2. The cavity contains the active body 103, for example a gas cell for example of carbone dioxide $CO_2$. This cell receives the pumping energy from the high-frequency source 104, through the medium of two electrodes.

It is well known that, by arranging in a laser cavity an element which has variable transmission losses, the light produced by the laser is modulated. This modulation is performed here by the MOS device.

In FIG. 7, the mirror 10 is discarded; the MOS device 106, the reflection ratio of which is variable as in the case of FIG. 3, forms other mirror of the cavity.

It is well known that under these conditions the light source will produce radiation modulated at the rate of the variation in the reflecting power of the mirror.

Of course the invention is not limited to the embodiments described and shown which were given solely by way of example.

What is claimed, is:

1. A device for modulating a beam of radiation having a predetermined wavelength comprising: a substrate of doped semiconductor material partially transparent to said radiation and having at least two valence bands, and said beam of radiation of said predetermined wavelength causing the transition of electrons from a lower valence band to an upper valence band; an insulating layer extending over said substrate; a conductive layer extending over said insulating layer, and means for applying between said conductive layer and said substrate a modulating voltage, whereby the beam of radiation is modulated.

2. A device as claimed in claim 1, wherein said conductive layer is transparent to said radiation.

3. A device as claimed in claim 2, wherein said conductive layer is a semiconductor material.

4. A device as claimed in claim 3, further comprising antireflection coatings extending on said conductive layer and on said substrate respectively.

5. A device as claimed in claim 1, wherein said conductive layer reflects said radiation.

6. A device as claimed in claim 5, wherein a low reflectance film covers the exposed face of said substrate.

7. A device as claimed in claim 5, further comprising a second insulating layer deposited on said substrate, said substrate being sandwiched between said insulating layers, a second conductive layer extending over said second insulating layer, said conductive layers reflecting said radiations, and means for applying said modulating voltage to both conductive layers.

8. A device as claimed in claim 7, wherein at least one of said conductive layer partially reflects said radiation.

9. An amplitude modulated laser for emitting a beam of radiation having a predetermined wavelength comprising two mirrors for defining a laser cavity an active body of laser material between said mirrors, and a modulating device as claimed in claim 1, for modulating said beam of radiation positioned between one of said mirrors and said body of laser material.

10. An amplitude modulated laser device for emitting a beam of radiation having a predetermined wavelength comprising a modulating device as claimed in claim 5 for modulating said beam of radiation, a partially reflecting mirror, and an active body of laser material between said modulating device and said mirror, said modulating device and said mirror defining a laser cavity.

* * * * *